(12) United States Patent
Tableau et al.

(10) Patent No.: US 11,208,906 B2
(45) Date of Patent: Dec. 28, 2021

(54) CONNECTION BETWEEN A CERAMIC MATRIX COMPOSITE STATOR SECTOR AND A METALLIC SUPPORT OF A TURBOMACHINE TURBINE

(71) Applicants: SAFRAN AIRCRAFT ENGINES, Paris (FR); SAFRAN HELICOPTER ENGINES, Bordes (FR)

(72) Inventors: Nicolas Paul Tableau, Moissy-Cramayel (FR); Sébastien Serge Francis Congratel, Moissy-Cramayel (FR); Lucien Henri Jacques Quennehen, Moissy-Cramayel (FR); Gilles Gérard Claude Lepretre, Moissy-Cramayel (FR); Denis Daniel Jean Boisseleau, Moissy-Cramayel (FR)

(73) Assignees: SAFRAN AIRCRAFT ENGINES, Paris (FR); SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 16/769,498

(22) PCT Filed: Dec. 3, 2018

(86) PCT No.: PCT/EP2018/083378
§ 371 (c)(1),
(2) Date: Jun. 3, 2020

(87) PCT Pub. No.: WO2019/110526
PCT Pub. Date: Jun. 13, 2019

(65) Prior Publication Data
US 2021/0189895 A1    Jun. 24, 2021

(30) Foreign Application Priority Data
Dec. 5, 2017    (FR) ...................................... 1761680

(51) Int. Cl.
*F01D 25/24*  (2006.01)
*F01D 9/04*   (2006.01)
*F01D 5/28*   (2006.01)

(52) U.S. Cl.
CPC ........... *F01D 9/042* (2013.01); *F01D 25/246* (2013.01); *F01D 5/282* (2013.01); *F01D 5/284* (2013.01);
(Continued)

(58) Field of Classification Search
CPC . F01D 9/04; F01D 9/042; F01D 25/24; F01D 25/243; F01D 25/246; F01D 5/282;
(Continued)

(56) References Cited

U.S. PATENT DOCUMENTS 8,403,636 B2     3/2013  Dakowski et al.
2014/0023482 A1*  1/2014  Wada .................... C23C 28/345
                                                415/110
(Continued)

FOREIGN PATENT DOCUMENTS

EP    3 124 750 A1    2/2017
FR    2 887 920 A1    1/2007
(Continued)

OTHER PUBLICATIONS

Written Opinion of the International Searching Authority dated Jan. 24, 2019, issued in corresponding International Application No. PCT/EP2018/083378, filed Dec. 3, 2018, 6 pages.
(Continued)

*Primary Examiner* — Woody A Lee, Jr.
*Assistant Examiner* — Maxime M Adjagbe
(74) *Attorney, Agent, or Firm* — Christensen O'Connor Johnson & Kindness PLLC

(57) ABSTRACT

A turbine of a turbomachine includes a ceramic matrix composite sector of a stator includes an outer platform and
(Continued)

an inner platform connected via at least one vane. The outer platform has means for attaching to a sector of a metallic support, the attachment means having at least one central rim and two lateral rims. The central rim is radially offset with respect to said lateral rims along a directrix line such that the central rim is radially on one side of said directrix line and the lateral rims on the other. The central rim and said central hook bear radially against one another and are located radially on either side of said directrix line. The lateral rim and said corresponding lateral hook bear radially against one another and are located radially on either side of said directrix line.

15 Claims, 2 Drawing Sheets

(52) U.S. Cl.
CPC .... *F05D 2240/12* (2013.01); *F05D 2250/294* (2013.01); *F05D 2260/36* (2013.01); *F05D 2300/6033* (2013.01)

(58) Field of Classification Search
CPC ...... F01D 5/284; F05D 11/08; F05D 2240/12; F05D 2260/36

See application file for complete search history.

(56) References Cited

U.S. PATENT DOCUMENTS

| | | | |
|---|---|---|---|
| 2015/0044035 A1* | 2/2015 | Cottom | C23C 28/3455 |
| | | | 415/173.4 |
| 2016/0160665 A1* | 6/2016 | Simpson | F04D 29/544 |
| | | | 415/208.2 |
| 2016/0169033 A1 | 6/2016 | Weaver et al. | |
| 2016/0333894 A1* | 11/2016 | K. | F04D 29/542 |
| 2017/0002671 A1* | 1/2017 | Waite | F01D 9/06 |
| 2017/0022842 A1* | 1/2017 | Spangler | F01D 25/12 |
| 2017/0298776 A1* | 10/2017 | Rogers | F01D 11/08 |
| 2017/0335712 A1* | 11/2017 | Chakka | F01D 9/041 |
| 2018/0230837 A1 | 8/2018 | Quennehen | |

FOREIGN PATENT DOCUMENTS

| | | |
|---|---|---|
| FR | 2 913 051 A1 | 8/2008 |
| FR | 2 961 850 A1 | 12/2011 |
| FR | 3 040 734 A1 | 3/2017 |

OTHER PUBLICATIONS

International Preliminary Report on Patentability dated Jun. 9, 2020, issued in corresponding International Application No. PCT/EP2018/083378, filed Dec. 3, 2018, 1 page.
International Search Report dated Jan. 24, 2019, issued in corresponding International Application No. PCT/EP2018/083378, filed Dec. 3, 2018, 5 pages.

* cited by examiner

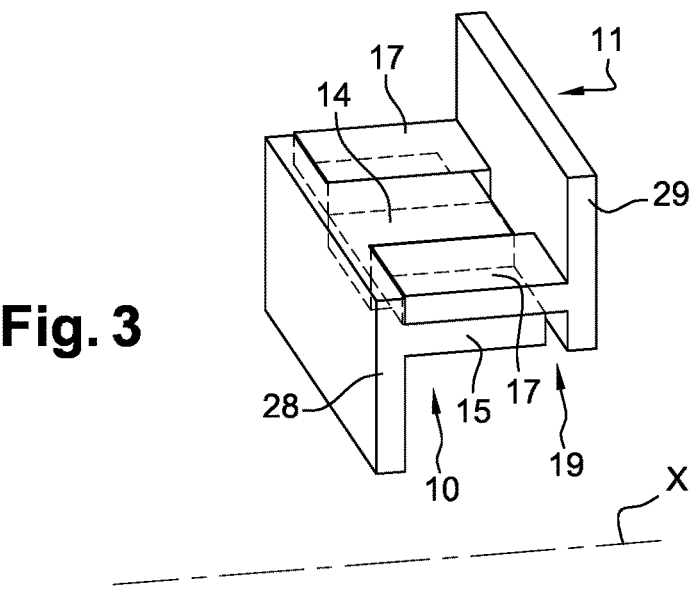
Fig. 3
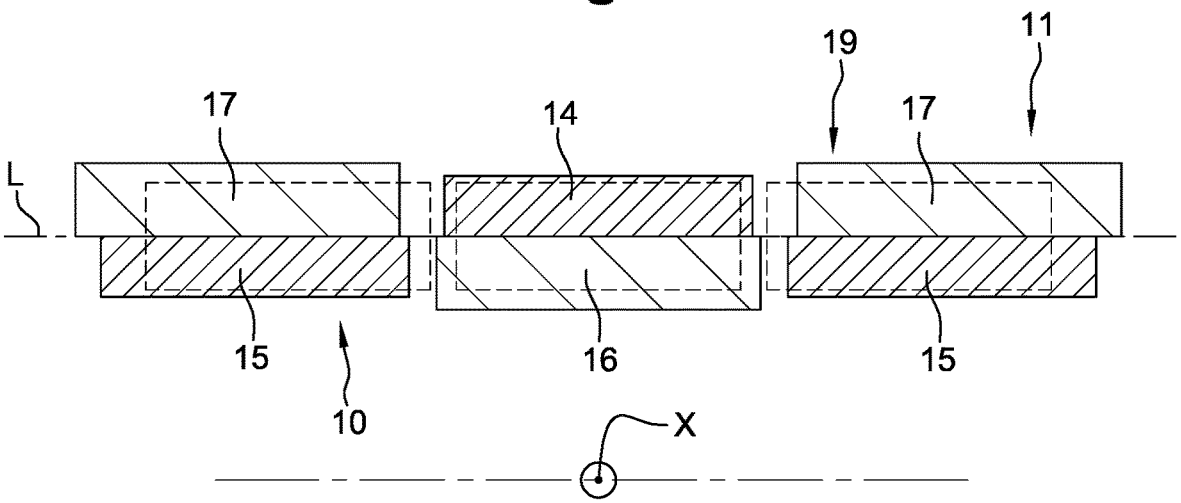
Fig. 4
Fig. 5

CONNECTION BETWEEN A CERAMIC MATRIX COMPOSITE STATOR SECTOR AND A METALLIC SUPPORT OF A TURBOMACHINE TURBINE

TECHNICAL BACKGROUND

This invention concerns the field of turbomachines such as a turbojet or turboprop engine for aircraft, and more particularly a connection between a ceramic matrix composite turbine stator and a metallic support for the turbine stator of a turbine of such a turbomachine.

BACKGROUND

It is known from documents FR-A1-2961850, FR-A1-2887920 or FR-A1-2913051 in the name of the applicant, a turbomachine turbine comprising at least one stage consisting of a sectorized annular turbine stator having a row of fixed straightening vanes and a rotor wheel (also called a vane wheel) which is mobile in rotation, the rotor wheel being mounted downstream of the turbine stator with respect to the direction of flow of the exhaust gases in the turbine.

More precisely, the turbine stator comprises two coaxial annular platforms, respectively inner and outer, between which the fixed straightening vanes extend. The outer platform and the inner platform define between them a portion of a duct through which the exhaust gases flow.

In general, the outer platform of the turbine stator comprises attachment means which cooperate with reception means of an annular sectorized support flanged to a fixed outer turbine casing, the support then being placed radially between the turbine stator and the turbine casing.

According to a well-known technique, the attachment means comprise an upstream circular rim and an downstream circular rim extending axially, the upstream and downstream rims being respectively configured to cooperate with an upstream hook and a downstream hook of the support. The rim and the corresponding hook are held with respect to each other by locking means. In order to guarantee the connection between the turbine stator and the support over time, and in other words to prevent the rims from disengaging from the hooks under the action of external stresses (aerodynamic forces of the exhaust gases, thermal expansion, etc.), the rims and the hooks are mounted with pre-stress (or pre-load) via the locking means.

In the case where the materials of the turbine stator and the support are different, i.e. for example a ceramic matrix composite (CMC) turbine stator and a metallic support, the pre-stress to be applied is significant, in particular because of the appearance of significant localised forces at interfaces between the rims and the hooks when the turbomachine is in operation, these forces resulting in particular from the different behaviour of the materials with regard to thermal stresses.

The use of ceramic matrix composite obviously allows to minimise the mass of the turbine, and more generally of the turbomachine.

It should also be noted that a ceramic matrix composite turbine stator withstands higher temperatures than a metallic turbine stator. Thus, ceramic matrix composite turbine stators offer the possibility of having higher exhaust gas temperatures in the duct and require less cooling air, to the benefit of the efficiency of the turbomachine.

However, a ceramic matrix composite turbine stator has lower mechanical strength than a metallic turbine stator. The above-mentioned mechanical feature makes it impossible to apply a significant pre-stress to the assembly, as otherwise premature wear of the rims in the areas in contact with the locking means may occur.

The objective of this invention is therefore to propose a connection between a ceramic matrix composite turbine stator and a metallic support for the turbine stator, this connection making it possible to remedy the above-mentioned difficulties encountered.

DISCLOSURE OF THE INVENTION

For this purpose, the invention provides a sector of an annular sectorized turbine stator made of ceramic matrix composite for a turbine of a turbomachine, said sector of the turbine stator comprising an outer platform and an inner platform coaxial with said outer platform, said outer platform being connected to said inner platform via at least one fixed straightening vane extending in a radial direction, said outer platform comprising attachment means for attaching to a sector of an annular sectorized metallic support, characterised in that the attachment means comprise at least one central rim and two lateral rims located circumferentially on either side of the central rim, the rims extending in an axial direction perpendicular to the radial direction, said central rim being radially offset with respect to said lateral rims along a guiding line coinciding with a face of each of said rims such that the central rim is radially on one side of said guiding line and the lateral rims on the other, said central rim being configured to cooperate with a central hook of said sector of the support so that said central rim and said central hook are bearing radially against one another and are located radially on either side of said guiding line, each lateral rim being configured to cooperate with a lateral hook of said sector of the support so that said lateral rim and said corresponding lateral hook are bearing radially against one another and are located radially on either side of said guiding line.

Compared to the prior art shown above, such a connection does not require a locking and mounting member with a high degree of pre-stress. In operation, the external stresses (aerodynamic forces of the exhaust gases, thermal expansion, etc.) are taken up homogeneously by all the rims of each of the sectors forming the turbine stator, so as to distribute the external efforts at the rims without generating stress concentrations, to the benefit of the service life of the attachment means and more generally of the connection between the sectors of the turbine stator and the associated sectors of the support. In addition, such a connection makes it possible to considerably simplify the assembly of each sector of the turbine stator, to the benefit of productivity.

The sector of the turbine stator according to the invention may comprise one or more of the following features, taken in isolation from one another or in combination with one another:
- each lateral rim is circumferentially offset from said central rim by a predetermined distance which is preferably less than 0.5 mm;
- the guiding line is rectilinear or curvilinear;
- each of said rims has a rectangular cross-section.

The second object of the invention is a sector of an annular sectorized support for a turbine stator of a turbine of a turbomachine, said sector of the support being metallic and comprising an outer shell comprising reception means for receiving a ceramic matrix composite sector of the turbine stator as described above, characterised in that the reception means comprise at least one central hook and two lateral hooks located circumferentially on either side of the central hook, the hooks extending in an axial direction, said central hook being radially offset with respect to said lateral hooks along a guiding line coinciding with one face of each of said hooks so that the central hook is radially on one side of said guiding line and the lateral hooks on the other, said central hook being configured to cooperate with a central rim of said sector of the turbine stator so that said central hook and said central rim are bearing radially against one another and are located radially on either side of said guiding line, each lateral hook being configured to cooperate with a lateral rim of said sector of the turbine stator so that said lateral hook and said corresponding lateral rim are bearing radially against one another and are located radially on either side of said guiding line.

Compared to the above-mentioned prior art, such a connection does not require a locking and mounting member with a high degree of pre-stress. In operation, the external stresses (aerodynamic forces of the exhaust gases, thermal expansion) are taken up homogeneously by all the hooks of each of the sectors forming the support, so as to distribute the external efforts at the hooks without generating stress concentrations, to the benefit of the service life of the reception means and more generally of the connection between the sectors of the turbine stator and the associated sectors of the support.

The sector of the support according to the invention may comprise one or more of the following features, taken in isolation from each other or in combination with each other:
  each lateral hook is circumferentially offset from said central hook by a predetermined distance which is preferably less than 0.5 mm;
  the guiding line is rectilinear or curvilinear;
  each of said hooks has a rectangular cross-section.

The third object of the invention is an annular sectorized turbine stator of a turbine of a turbomachine comprising a plurality of sectors of the turbine stator as previously described, said sectors of the turbine stator being arranged circumferentially end to end.

The fourth object of the invention is an annular sectorized support for a turbine stator of a turbine of a turbomachine comprising a plurality of sectors of the support as previously described, said sectors of the support being arranged circumferentially end to end.

The fifth object of the invention is an assembly of a turbine of a turbomachine comprising a sector of the turbine stator as previously described and a sector of the support as previously described, the central rim cooperating with the central hook, the central rim and the central hook bearing radially against one another and being located radially on either side of a common guiding line, each lateral rim cooperating with a corresponding lateral hook, the lateral rim and the corresponding lateral hook bearing radially against one another and being located radially on either side of the common guiding line.

The sixth object of the invention is a turbine of a turbomachine comprising an assembly as previously described.

The seventh object of the invention is a turbomachine comprising a turbine as previously described.

DESCRIPTION OF THE FIGURES

The invention will be better understood and other details, features and advantages of the invention will appear more clearly when reading the following description made by way of non-exhaustive example and with reference to the annexed drawings in which:

FIG. 3 is a perspective view of the attachment means of the sector of the turbine stator and the reception means of the sector of the support, in an assembled position;

FIG. 4 is a sectional view of the attachment means and the reception means along a radial plane passing through the attachment means and the reception means, when the turbine is cold;

FIG. 5 is a sectional view of the attachment means and the reception means along a radial plane passing through the attachment means and the reception means, when the turbine is hot.

DETAILED DESCRIPTION

Figure 1:
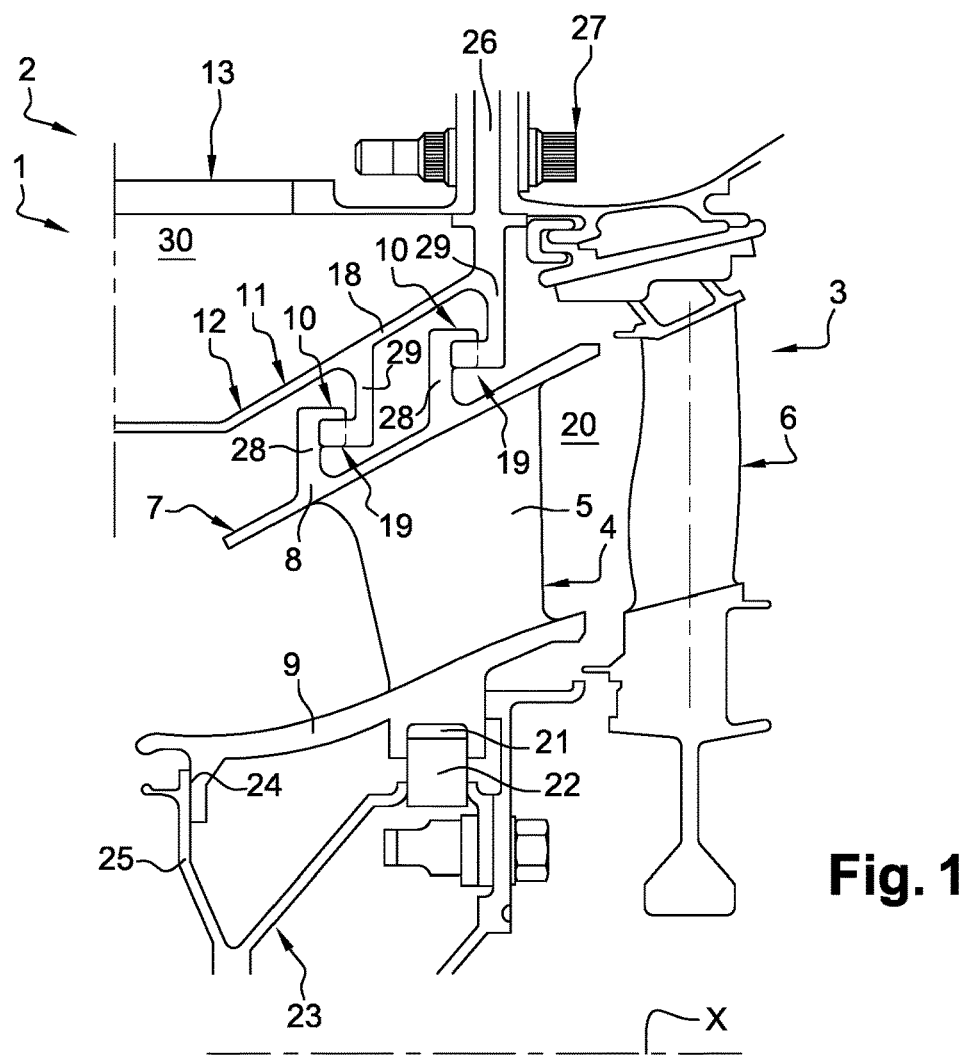
FIG. 1 is a longitudinal sectional view of a turbine of a turbomachine.

FIG. 1 shows a part of a turbine 1 of a turbomachine 2 such as an aircraft turbojet or turboprop engine, this turbine 1 being arranged downstream of a combustion chamber with respect to the direction of gas flow in the turbomachine 2.

The turbine 1 comprises an upstream turbine commonly referred to as a "high pressure turbine" (not shown) and a partially shown downstream turbine commonly referred to as a "low-pressure turbine" comprising several low-pressure stages, only one low-pressure stage 3 being shown in FIG. 1.

More precisely, the low-pressure stage 3 comprises a low-pressure annular sectorized turbine stator 4 having a row of fixed straightening vanes 5 and a low-pressure rotor wheel 6 mobile in rotation about an axis X, the low-pressure rotor wheel 6 being mounted downstream of the low-pressure turbine stator 4.

By convention in this patent application, "axial" or "axially" means any direction parallel to the axis X, and "radial" or "radially" means any direction perpendicular to the axis X. Similarly, by convention in this patent application, the terms "inner", "outer", "internal" or "external" are defined radially with respect to the axis X. Finally, the terms "upstream" and "downstream" are defined in relation to the direction of gas flow in the turbomachine 2.

The low-pressure turbine stator 4 of the turbine 1 comprises a plurality of sectors 7 of the turbine stator 4, the sectors being made of ceramic matrix composite (CMC) and arranged circumferentially end to end around the axis X.

Note that a ceramic matrix composite (CMC) is a material comprising a ceramic matrix and ceramic fibres. The matrix is made of, for example, carbon or silicon carbide. For example, the matrix is deposited on a ceramic fibre preform by chemical vapour deposition (CVD).

Each sector 7 of the low-pressure turbine stator 4 comprises of an outer platform 8 and an inner platform 9 coaxial with the outer platform 8, the latter being centred on the axis X. The outer platform 8 is connected to the inner platform 9 via at least one fixed straightening vane 5 extending in the radial direction (e.g. three). In addition, the outer platform 8 comprises attachment means 10 for attaching to a sector 11 of an annular sectorized metallic support 12 flanged to a fixed outer turbine casing 13.

The attachment means 10 comprise at least a central rim 14 and two lateral rims 15 located circumferentially on either side of the central rim 14. The rims 14, 15 extend in the axial direction perpendicular to the radial direction. The central rim 14 is radially offset from the lateral rims 15 along a guiding line L coinciding with one face of each of the rims 14, 15 so that the central rim 14 is radially on one side of the guiding line L and the lateral rims 15 are on the other side.

The central rim 14 is configured to cooperate with a central hook 16 of the corresponding sector 11 of the support 12 such that the central rim 14 and the central hook 16 are bearing radially against one another and are located radially on either side of the guiding line L. Each lateral rim 15 is configured to cooperate with a lateral hook 17 of the corresponding sector 11 of the support 12 such that the lateral rim 15 and the corresponding lateral hook 17 are bearing radially against one another and are located radially on either side of the guiding line L.

The support 12 for the low-pressure turbine stator 4 comprises a plurality of metallic sectors 11 of the support 12 arranged circumferentially end to end around the axis X.

Each sector 11 of the support 12 for the low-pressure turbine stator 4 comprises an outer shell 18 centred on the axis X comprising reception means 19 for receiving a corresponding sector 7 of the turbine stator 4.

The reception means 19 comprise at least one central hook 16 and two lateral hooks 17 located circumferentially on either side of the central hook 16. The hooks 16, 17 extend in the axial direction. The central hook 16 is radially offset with respect to the lateral hooks 17 along a guiding line L coinciding with one face of each of the hooks 16, 17 so that the central hook 16 is radially on one side of the guiding line L and the lateral hooks 17 on the other.

The central hook 16 is configured to cooperate with a central rim 14 of the corresponding sector 7 of the turbine stator 4 such that the central hook 16 and the central rim 14 are bearing radially against one another and are located radially on either side of the guiding line L. Each lateral hook 17 is configured to cooperate with a lateral rim 15 of the corresponding sector 7 of the turbine stator 4 such that the lateral hook 17 and the corresponding lateral rim 15 are bearing radially against one another and located radially on either side of the guiding line L.

The example shown in FIG. 1 is by no means limiting, the low-pressure turbine stator 4 shown above could be a high-pressure turbine stator.

The inner platform 9 and the outer platform 8 define between them a portion of an annular duct 20 through which the gas flow passes.

According to the embodiment shown in FIG. 1, the outer platform 8 is frustoconical and widens from upstream to downstream. The inner platform 9 is also substantially frustoconical and widens from upstream to downstream. The inner platform 9 further comprises an inner groove 21 coinciding with a guide ring 22 secured to a fixed inner turbine casing 23 and a upstream radial shoulder 24 in axial abutment with a upstream radial partition 25 of the inner turbine casing 23.

According to the embodiment shown in FIG. 1, the outer shell 18 is frustoconical and widens from upstream to downstream. The outer shell 18 comprises an outer flange 26 which is attached between two sections of the outer turbine casing 13 by means of bolts 27.

According to the embodiment illustrated in FIG. 1, the outer platform 8 of the sector 7 of the low-pressure turbine stator 4 comprises axially offset upstream and downstream attachment means 10. The upstream and downstream attachment means 10 of the sector 7 of the low-pressure turbine stator 4 are configured to cooperate respectively with upstream and downstream reception means 19 of the corresponding sector 11 of the support 12 for the turbine stator 4. The upstream and downstream attachment means 10 are placed at the radially outer end of an upstream circular collar 28 and a downstream circular collar 28 extending radially outwards from the outer platform 8. The upstream and downstream reception means 19 are placed at the radially inner end of an upstream circular wall 29 and a downstream circular wall 29 extending radially inwards from the outer shell 18.

The guiding line L common to the attachment means 10 and the reception means 19 is in this case rectilinear L but could be curvilinear, e.g. circular.

When the turbomachine is in operation, the maintenance of a straight or curvilinear guiding line may be achieved by means of cooling air diffusers configured to maintain a uniform temperature distribution along the guiding line.

Figure 2:
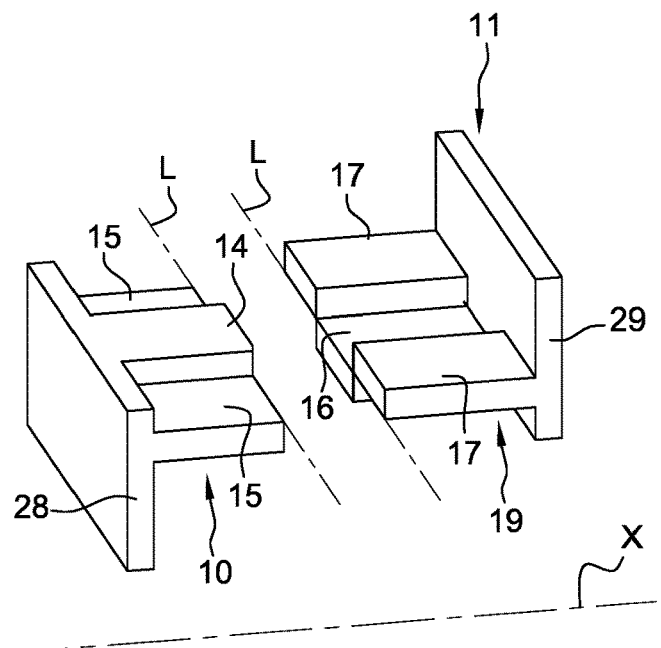
FIG. 2 is a perspective view of the attachment means of a sector of a turbine stator and reception means a sector of the support, in a disassembled position.

As shown in FIGS. 2 and 3, the attachment means 10 comprise an outer central rim 14 and two inner lateral rims 15, i.e., the central rim 14 is positioned in the radial direction outside the guiding line L and the lateral rims 15 are positioned inside the guiding line L. The inner face of the central rim 14 is coinciding with the guiding line L. The outer face of each lateral rim 15 is coinciding with the guiding line L. The rims 14, 15 are rectangular in cross-section and extend axially downstream. The rims 14, 15 in this case have equal dimensional features but could vary.

The upstream and downstream attachment means 10 are formed as an integral part of the upstream and downstream collars 28, respectively, but they could be connected by fastening means such as bolts.

As shown in FIG. 4, each lateral rim 15 is circumferentially offset from the central rim 14 by a predetermined distance E. These distances E define gaps required to prevent contact between the rims 14, 15 when the turbomachine 2 is in operation. The distance E can vary from 0 mm to about 0.5 mm.

As shown in FIGS. 2 and 3, the reception means 19 comprise an inner central hook 16 and two outer lateral hooks 17, i.e. the central hook 16 is positioned in the radial direction inside the guiding line L and the lateral hooks 17 outside the guiding line L. The outer face of the central hook 16 is coinciding with the guiding line L. The inner face of each lateral hook 17 is coinciding with the guiding line L. The hooks 16, 17 are rectangular in section and extend axially upstream. The hooks 16, 17 have similar dimensional features in this case but could vary. These dimensional features are also similar to those of the rims 14, 15.

The upstream and downstream reception means 19 are formed as an integral part of the upstream and downstream walls 29, respectively, but they could be connected by fastening means such as bolts.

As shown in FIG. 4, in the same manner as the rims 14, 15, each lateral hook 17 is circumferentially offset from the central hook 16 by a predetermined distance E. These distances E define gaps required to prevent contact between the hooks 16, 17 when the turbomachine 2 is in operation. The distance E can vary from 0 mm to about 0.5 mm.

When on the one hand the upstream attachment means 10 are opposite the upstream reception means 19 and on the other hand the downstream attachment means 10 are opposite the downstream reception means 19 (FIG. 2), the sector 7 of the turbine stator 4 is finally moved axially from the upstream to the downstream on the corresponding sector 11 of the support 12.

Following the assembly, in the assembled position (FIG. 3), the inner face of the central rim 14 is bearing radially with the outer face of the central hook 16, the central rim 14 being outside the guiding line L and the central hook 16 being inside the guiding line L. In addition, the outer face of each lateral rim 15 is bearing radially with the inner face of the corresponding lateral hook 17, each lateral rim 15 being inside the guiding line L and each lateral hook 17 being outside the guiding line L. The upstream end of the hooks 16, 17 is in axial abutment against the collars 28 (FIG. 3).

During the assembly, each rim 14, 15 is mounted, bearing radially with the corresponding hook 16, 17 with a predetermined negative radial gap so that the rim 14, 15 is axially held with respect to the corresponding hook 16, 17 by friction forces (axial forces) after the assembly. In order to achieve the desired negative radial gap, each rim 14, 15 is paired with the corresponding hook 16, 17.

FIG. 5 shows in superimposed continuous lines the connection between the attachment means 10 and the reception means 19 when hot (i.e. when the latter are subjected to hot exhaust gases) and in dotted lines the connection between the attachment means 10 and the reception means 19 when cold (e.g. after the assembly).

Thanks to a uniform cooling along the common guiding line L by means of diffusers and thanks to the cooperating geometries of the attachment and reception means, the guiding line L remains substantially constant despite external stresses (aerodynamic forces of the exhaust gases, thermal expansion, etc.), which means in particular that the rims 14, 15 absorb external stresses homogeneously without generating stress concentrations during the various phases of operation of the turbine.

It should also be noted that the rims 14, 15 (the hooks 16, 17 respectively) do not come into contact with each other when they are deformed by external stresses.

As shown in FIG. 1, the turbine 1 comprises an enclosure 30 which is annular with an axis X for cooling the shells 18 and outer platforms 8. The enclosure 30 is bounded internally by the shells 18 and externally by the outer turbine casing 13. The cooling and ventilation air comes from, for example, compressors located upstream of the combustion chamber with respect to the direction of gas flow in the turbomachine 2.

The low-pressure turbine stator 4 comprises sealing means (not shown) placed between two sectors 7 of the turbine stator 4 abutting at the level of the inner and outer platforms 8, 9. These sealing means make it possible to limit in particular radial gas leaks from the duct 20 to the enclosure 30, and vice versa, to the benefit of the efficiency of the turbine 1.

The invention claimed is:

1. A sector of an annular sectorized turbine stator made of ceramic matrix composite for a turbine of a turbomachine, said sector of the turbine stator comprising an outer platform and an inner platform coaxial with said outer platform, said outer platform being connected to said inner platform via at least one fixed straightening vane extending in a radial direction, said outer platform comprising attachment means for attaching to a sector of an annular sectorized metallic support,
wherein the attachment means comprise a central rim and first and second lateral rims located circumferentially on either side of the central rim, the central rim and the lateral rims extending in an axial direction perpendicular to the radial direction, said central rim being radially offset with respect to said lateral rims along a guiding line (L) coinciding with a face of each of said central rim and the lateral rims such that the central rim is radially on one side of said guiding line (L) and the lateral rims on the other, said central rim being configured to cooperate with a central hook of said sector of the support so that said central rim and said central hook are bearing radially against one another and are located radially on either side of said guiding line (L), the first and second lateral rims being configured to cooperate with corresponding first and second lateral hooks, respectively, of said sector of the support so that each lateral rim and said corresponding lateral hook are bearing radially against one another and are located radially on either side of said guiding line (L).

2. The sector of the turbine stator according to claim 1, wherein each lateral rim is circumferentially offset from said central rim by a predetermined distance (E).

3. The sector of the turbine stator according to claim 2, wherein the predetermined distance (E) is less than 0.5 mm.

4. The sector of the turbine stator according to claim 1, wherein the guiding line (L) is rectilinear or curvilinear.

5. The sector of the turbine stator according to claim 1, wherein each of said rims has a rectangular cross-section.

6. An annular sectorized turbine stator of a turbine of a turbomachine comprising a plurality of sectors of the turbine stator according to claim 1, said sectors of the turbine stator being arranged circumferentially end to end.

7. An assembly of a turbine of a turbomachine comprising the annular sectorized turbine stator and the annular sectorized metallic support according to claim 1.

8. A turbine of a turbomachine comprising the assembly according to claim 7.

9. A turbomachine comprising the turbine according to claim 8.

10. A sector of an annular sectorized support of a turbine of a turbomachine, said sector of the support being metallic and comprising an outer shell comprising reception means for receiving a ceramic matrix composite sector of a turbine stator, wherein the reception means comprise a central hook and first and second lateral hooks located circumferentially on either side of the central hook, the central hook and lateral hooks extending in an axial direction, said central hook being radially offset with respect to said lateral hooks along a guiding line (L) coinciding with one face of each of said central hook and lateral hooks so that the central hook is radially on one side of said guiding line (L) and the lateral hooks on the other, said central hook being configured to cooperate with a central rim of said sector of the turbine stator so that said central hook and said central rim are bearing radially against one another and are located radially on either side of said guiding line (L), the first and second lateral hooks being configured to cooperate with corresponding first and second lateral rims, respectively, of said sector of the turbine stator so that each lateral hook and said corresponding lateral rim are bearing radially against one another and are located radially on either side of said guiding line (L).

11. The sector of the support according to claim 10, wherein each lateral hook is circumferentially offset from said central hook by a predetermined distance (E).

12. The sector of the support according to claim 11, wherein the predetermined distance (E) is less than 0.5 mm.

13. The sector of the support according to claim 10, wherein the guiding line (L) is rectilinear or curvilinear.

14. The sector of the support according to claim 10, wherein each of said hooks has a rectangular cross-section.

15. An annular sectorized support for a turbine stator of a turbine of a turbomachine comprising a plurality of sectors of the support according to claim 10, said sectors of the support being arranged circumferentially end to end.

* * * * *